United States Patent
Copty et al.

(10) Patent No.: US 11,704,119 B2
(45) Date of Patent: Jul. 18, 2023

(54) MIGRATING INFRASTRUCTURE AS CODE BETWEEN DIFFERENT CLOUD PROVIDERS

(71) Applicant: INTERNATIONAL BUSINESS MACHINES CORPORATION, Armonk, NY (US)

(72) Inventors: Fady Copty, Nazareth (IL); Lev Greenberg, Haifa (IL); Dov Murik, Haifa (IL); Omer Yehuda Boehm, Haifa (IL); Omri Soceanu, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 173 days.

(21) Appl. No.: 17/458,125

(22) Filed: Aug. 26, 2021

(65) Prior Publication Data

US 2023/0075183 A1    Mar. 9, 2023

(51) Int. Cl.
| | |
|---|---|
| *G06F 8/76* | (2018.01) |
| *G06F 40/40* | (2020.01) |
| *G06N 20/00* | (2019.01) |
| *G06F 8/51* | (2018.01) |

(52) U.S. Cl.
CPC .......... *G06F 8/76* (2013.01); *G06F 8/51* (2013.01); *G06F 40/40* (2020.01); *G06N 20/00* (2019.01)

(58) Field of Classification Search
None
See application file for complete search history.

(56) References Cited

U.S. PATENT DOCUMENTS

| | | | |
|---|---|---|---|
| 6,698,014 B1 | 2/2004 | Rechter | |
| 10,778,513 B2 | 9/2020 | Kishen | |
| 11,010,191 B1 * | 5/2021 | Hornbeck | H04L 67/133 |
| 11,327,750 B1 * | 5/2022 | Chawda | G06F 9/22 |
| 11,372,749 B2 * | 6/2022 | Wiener | G06F 8/71 |
| 11,385,892 B1 * | 7/2022 | Zhang | G06F 16/9535 |
| 11,537,400 B1 * | 12/2022 | Zhang | G06F 8/51 |
| 11,579,868 B1 * | 2/2023 | Zhang | G06N 20/00 |

(Continued)

OTHER PUBLICATIONS

Jammal et al., "Generic input template for cloud simulators: Acase study of CloudSim," Wiley, 2018, 28pg. (Year: 2018).*

(Continued)

*Primary Examiner* — Ryan D. Coyer
(74) *Attorney, Agent, or Firm* — Steven M. Bouknight

(57) ABSTRACT

A method for automatically migrating infrastructure as code (IaC) from a first cloud infrastructure platform to a second cloud infrastructure platform is provided. The method may include receiving an original IaC comprising a first type of coding language. The method may further include using natural language processing to map a connection between the first type of coding language and a second type of coding language. The method may further include based on the mapped connection, using the NLP to automatically generate a partial translation of the first type of coding language to the second type of coding language. The method may further include using a machine learning algorithm to correct at least one inaccuracy in the partial translation. The method may further include generating a complete translation and implementing a second IaC on the second cloud infrastructure platform based on the complete translation.

20 Claims, 6 Drawing Sheets

(56) References Cited

U.S. PATENT DOCUMENTS

| | | | |
|---|---|---|---|
| 2008/0216060 A1 | 9/2008 | Vargas | |
| 2015/0304230 A1* | 10/2015 | Suparna | G06Q 10/0631 709/224 |
| 2018/0336503 A1* | 11/2018 | Kushida | G06Q 10/06313 |
| 2020/0012480 A1* | 1/2020 | Rizo | G06F 21/577 |
| 2020/0034211 A1* | 1/2020 | Kumar P | G06N 7/00 |
| 2022/0318674 A1* | 10/2022 | Shukla | G06N 20/00 |

OTHER PUBLICATIONS

Kyryk et al., "Infrastructure as Code and Microservices for Intent-Based Cloud Networking," Springer, 2022, 18pg. (Year: 2022).*

Li et al., "Understanding and addressing quality attributes of microservices architecture: A Systematic literature review," Elsevier, 2020, 23 pg. (Year: 2020).*

Disclosed Anonymously, "Deep Learning to Translate Between Programming Languages," Facebook AI [research], Jul. 21, 2020 [accessed on Apr. 6, 2021], 10 pages, Retrieved from the Internet: <URL: https://ai.facebook.com/blog/deep-learning-to-translate-between-programming-languages/>.

Disclosed Anonymously, "Facebook Announces TransCoder AI to Translate Code Across Programming Languages," Infoq.com, [accessed on Jan. 27, 2021], 4 pages, Retrieved from the Internet: <URL: https://www.infoq.com/news/2020/06/facebook-ai-transpiler/>.

Disclosed Anonymously, "Translation," Google Cloud, [accessed Jan. 27, 2021], 12 pages, Retrieved from the Internet: <URL: https://cloud.google.com/translate>.

Gavlin, "From Terraform to Infrastructure as Software," Pulumi.com [blog], Nov. 2, 2018 [accessed Jan. 27, 2021], 13 pages, Retrieved from the Internet: <URL: https://www.pulumi.com/blog/from-terraform-to-infrastructure-as-software/>.

Mell et al., "The NIST Definition of Cloud Computing", Recommendations of the National Institute of Standards and Technology, NIST Special Publication 800-145, Sep. 2011, 7 pages.

* cited by examiner

MIGRATING INFRASTRUCTURE AS CODE BETWEEN DIFFERENT CLOUD PROVIDERS

BACKGROUND

The present invention relates generally to the field of computing, and more specifically, to automatically migrating infrastructure as code between different cloud infrastructure platforms/providers.

Generally, infrastructure as code (IaC) may manage and provision computer data centers through code. Specifically, IaC may be used to codify and manage IT infrastructure for an IT service, thereby enabling developers or operation teams of the IT service to automatically monitor and provision resources for the IT service rather than manually configuring hardware devices and operating systems. As such, IaC has significant presence in cloud computing. More specifically, IaC may be used for building cloud computing environments through configuration files by taking advantage of the instant resource provisioning capabilities offered by cloud computing and virtualization technology. For example, server automation and configuration management tools—such as Terraform® (Terraform and all Terraform-based trademarks and logos are trademarks or registered trademarks of HashiCorp and/or its affiliates)—may be used to write and implement an IaC on a specific cloud platform, such as Amazon® Web Services (AWS and all AWS-based trademarks and logos are trademarks or registered trademarks of Amazon.com, Inc. and/or its affiliates). More specifically, a configuration management tool such as Terraform® may be used to define resources and infrastructure using declarative configuration files as well as manage and deploy the resources and infrastructure on a cloud platform (such as AWS®).

SUMMARY

A method for automatically migrating infrastructure as code (IaC) from a first cloud infrastructure platform to a second cloud infrastructure platform is provided. The method may include receiving an original IaC associated with the first cloud infrastructure platform, wherein the original IaC comprises a first type of coding language associated with the first cloud infrastructure platform. The method may further include using natural language processing to map a connection between the first type of coding language associated with the received original IaC and a second type of coding language associated with the second cloud infrastructure platform. The method may further include based on the mapped connection, using the natural language processing to automatically generate a partial translation of the first type of coding language associated with the first cloud infrastructure platform to the second type of coding language associated with the second cloud infrastructure. The method may further include determining whether at least one inaccuracy exist in the partial translation, and in response to the determining that the at least one inaccuracy exist, using a machine learning algorithm to correct the at least one inaccuracy. The method may further include, based on the partial translation and the corrected at least one inaccuracy, generating a complete translation of the first type of coding language associated with the first cloud infrastructure platform to the second type of coding language associated with the second cloud infrastructure platform, and implementing a second IaC on the second cloud infrastructure platform based on the complete translation.

A computer system for automatically migrating infrastructure as code (IaC) from a first cloud infrastructure platform to a second cloud infrastructure platform is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving an original IaC associated with the first cloud infrastructure platform, wherein the original IaC comprises a first type of coding language associated with the first cloud infrastructure platform. The method may further include using natural language processing to map a connection between the first type of coding language associated with the received original IaC and a second type of coding language associated with the second cloud infrastructure platform. The method may further include based on the mapped connection, using the natural language processing to automatically generate a partial translation of the first type of coding language associated with the first cloud infrastructure platform to the second type of coding language associated with the second cloud infrastructure. The method may further include determining whether at least one inaccuracy exist in the partial translation, and in response to the determining that the at least one inaccuracy exist, using a machine learning algorithm to correct the at least one inaccuracy. The method may further include, based on the partial translation and the corrected at least one inaccuracy, generating a complete translation of the first type of coding language associated with the first cloud infrastructure platform to the second type of coding language associated with the second cloud infrastructure platform, and implementing a second IaC on the second cloud infrastructure platform based on the complete translation.

A computer program product for automatically migrating infrastructure as code (IaC) from a first cloud infrastructure platform to a second cloud infrastructure platform is provided. The computer program product may include one or more computer-readable storage devices and program instructions stored on at least one of the one or more tangible storage devices, the program instructions executable by a processor. The computer program product may include program instructions including receiving an original IaC associated with the first cloud infrastructure platform, wherein the original IaC comprises a first type of coding language associated with the first cloud infrastructure platform. The computer program product may further include program instructions including using natural language processing to map a connection between the first type of coding language associated with the received original IaC and a second type of coding language associated with the second cloud infrastructure platform. The computer program product may also include program instructions including, based on the mapped connection, using the natural language processing to automatically generate a partial translation of the first type of coding language associated with the first cloud infrastructure platform to the second type of coding language associated with the second cloud infrastructure. The computer program product may further include program instructions including determining whether at least one inaccuracy exist in the partial translation, and in response to the determining that the at least one inaccuracy exist, using a machine learning algorithm to correct the at least one inaccuracy. The computer program product may also include program instructions including, based on the partial translation and the corrected at least one inaccuracy, generating a complete translation of the first type of coding language associated with the first cloud infrastructure platform to the second type of coding language associated with the second cloud infrastructure platform, and implementing a second IaC on the second cloud infrastructure platform based on the complete translation.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
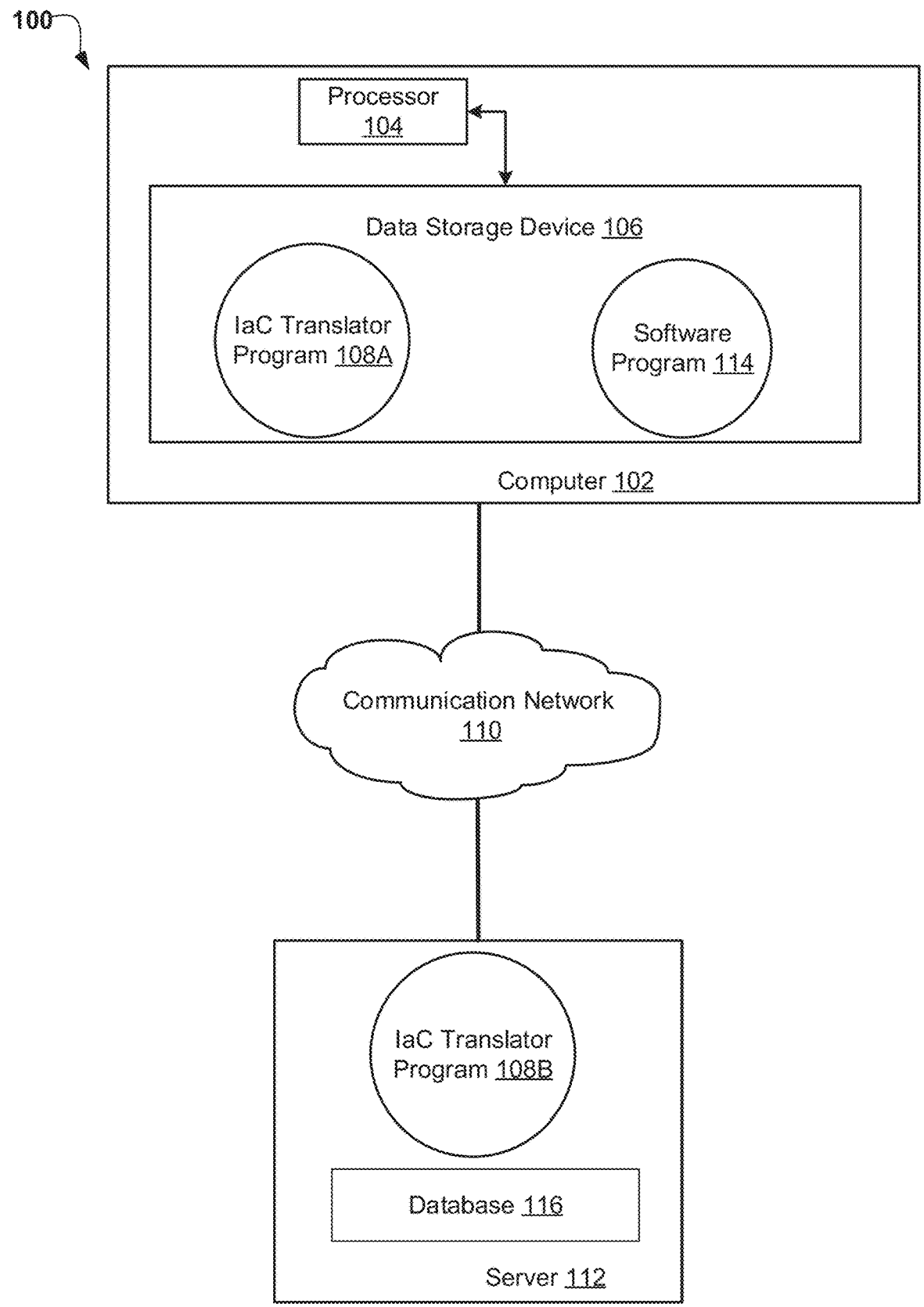
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate generally to the field of computing, and more particularly, to infrastructure as code. The following described exemplary embodiments provide a system, method and program product for automatically and cognitively transferring an IaC between different cloud providers. Specifically, the present embodiment has the capacity to improve the technical field associated with infrastructure as code and cloud computing by using natural language processing (NLP) and machine learning techniques to migrate an organization's cloud computing infrastructure, and more specifically the infrastructure as code, from one cloud provider to a different cloud provider. More specifically, the system, method and program product may use the natural language processing techniques to determine a relationship between coding attributes of one cloud provider and a different cloud provider, and in turn, partially translate the infrastructure as code to the different cloud provider based on the determined coding relationship. Thereafter, the system, method and program product may use a machine learning model to identify inaccuracies in the partial translation to further generate a complete and final translation.

As previously described with respect to infrastructure as code (IaC), IaC may be used for building cloud computing environments by, for example, using configuration files and instant resource provisioning capabilities offered by cloud computing and virtualization services. More specifically, for example and as previously described, a server automation and configuration management tools such as Terraform® may be used to build and implement IaC on a specific cloud infrastructure platform, such as AWS®. However, migrating IaC from one cloud infrastructure platform to another cloud infrastructure platform proves to be difficult when the coding language associated with an IaC is different between the cloud infrastructure platforms. For example, the coding language for implementing a specific resource, such as a storage bucket, on an IaC associated with AWS® may be different from the coding language for implementing that same and/or a similar resource on a different cloud infrastructure platform such as Google® Cloud (Google Cloud and all Google Cloud-based trademarks and logos are trademarks or registered trademarks of Google, Inc. and/or its affiliates). As such, rather than having to rebuild a cloud infrastructure from scratch each time, it would be more advantageous to package and organize cloud infrastructure to be built on demand based on an existing IaC.

Therefore, it may be advantageous, among other things, to provide a method, computer system, and computer program product for automatically and cognitively translating infrastructure as code languages between different cloud providers. Specifically, the method, computer system, and computer program product use the natural language processing techniques to determine a relationship between coding attributes of one cloud provider and a different cloud provider, and in turn, partially translate the infrastructure as code to the different cloud provider based on the determined coding relationship. Furthermore, the method, computer system, and computer program product may train and use a machine learning model to identify inaccuracies in the partial translation to further generate a complete and final translation. Also, according to one embodiment, the method, computer system, and computer program product may receive feedback to reinforce and further train the machine learning model to identify and fill in missing and/or incorrect language. In turn, the method, computer system, and computer program product may migrate the IaC associated with a first cloud infrastructure platform to the IaC associated with a different cloud infrastructure platform.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, an exemplary networked computer environment 100 in accordance with one embodiment is depicted. The networked computer environment 100 may include a computer 102 with a processor 104 and a data storage device 106 that is enabled to run an IaC translator program 108A and a software program 114, and may also include a microphone (not shown). The software program 114 may be an application program such as an infrastructure as code software tool, internet program, and/or one or more mobile apps running on a computer 102, such as a mobile phone device. The IaC translator program 108A may communicate with the software program 114. The networked computer environment 100 may also include a server 112 that is enabled to run an IaC translator program 108B and the communication network 110. The networked computer environment 100 may include a plurality of computers 102 and servers 112, only one of which is shown for illustrative brevity. For example, the plurality of computers 102 may include a plurality of interconnected devices, such as a mobile phone, tablet, and laptop, associated with one or more users.

According to at least one implementation, the present embodiment may also include a database 116, which may be running on server 112. The communication network 110 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The computer 102 may communicate with server computer 112 via the communications network 110. The communications network 110 may include connections, such as wire, wireless communication links, or fiber optic cables. As will be discussed with reference to FIG. 4, server computer 112 may include internal components 710a and external components 750a, respectively, and client computer 102 may include internal components 710b and external components 750b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the IaC translator program 108A, 108B may interact with a database 116 that may be embedded in various storage devices, such as, but not limited to, a mobile device 102, a networked server 112, or a cloud storage service. According to one embodiment, the database 116 may include a repository of sample data that includes different infrastructure as code languages associated with different cloud infrastructure platforms, resources associated with the different cloud infrastructure platforms, policy checks associated with the different cloud infrastructure platforms, and other attributes associated with the different coding languages and different cloud infrastructure platforms.

According to the present embodiment, a program, such as an IaC translator program 108A and 108B may run on the computer 102 and/or on the server computer 112 via a communications network 110. The IaC translator program 108A, 108B may automatically migrate the IaC associated with a first cloud infrastructure platform/provider to the IaC associated with a different, target cloud infrastructure platform/provider. Specifically, the computer 102, such as a desktop computer, laptop computer, tablet, and/or mobile device, may run an IaC translator program 108A, 108B, that may interact with a database 116 and a software program 114 to migrate the IaC associated with a first cloud infrastructure platform to the IaC associated with a different, target cloud infrastructure platform by automatically and cognitively translating coding language associated with the IaC of the first cloud infrastructure platform to the coding language of the IaC associated with the different cloud infrastructure platform. More specifically, the IaC translator program 108A, 108B may use natural language processing techniques to identify the coding language associated with the IaC of the first cloud infrastructure platform (as well as identify resources and other attributes corresponding to the coding language), and perform a partial translation of the coding language associated with the IaC of the first cloud infrastructure platform to the coding language associated with the IaC of the different, target cloud infrastructure platform. Thereafter, the IaC translator program 108A, 108B may train and use a machine learning model/algorithm to identify inaccuracies in the partial translation by, for example, filling in missing coding language and correcting other inaccuracies in the partial translation to generate a complete translation. Also, according to one embodiment, the IaC translator program 108A, 108B may receive reinforcement feedback to further finalize the complete translation as well as train the machine learning model/algorithm to identify and correct inaccuracies (i.e. missing and/or incorrect coding language). In turn, the method, computer system, and computer program product may migrate the IaC associated with a first cloud infrastructure platform/provider to the IaC associated with the different cloud infrastructure platform/provider.

Figure 2:
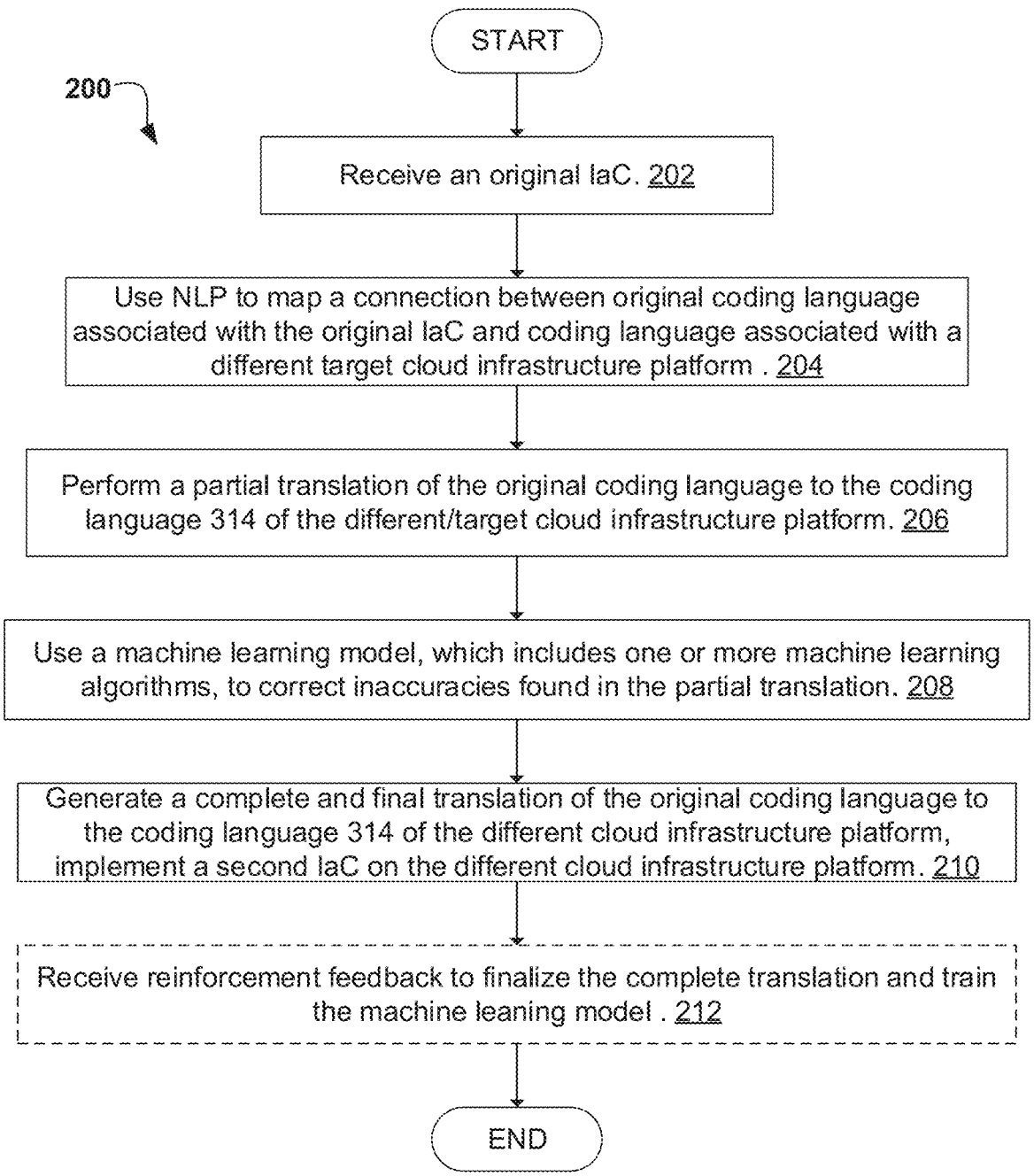
FIG. 2 is an operational flowchart illustrating the steps carried out by a program for automatically migrating infrastructure as code (IaC) from a first cloud infrastructure platform to a second cloud infrastructure platform according to one embodiment.

Referring now to FIG. 2, an operational flowchart 200 illustrating the steps carried out by the IaC translator program 108A, 108B for automatically migrating the IaC associated with a first cloud infrastructure platform/provider to the IaC associated with a different cloud infrastructure platform/provider according to one embodiment is provided. The operational flowchart 200 will be described with references to FIG. 3 which provides an example diagram 300 illustrating an embodiment of the IaC translator program 108A, 108B.

Figure 3:
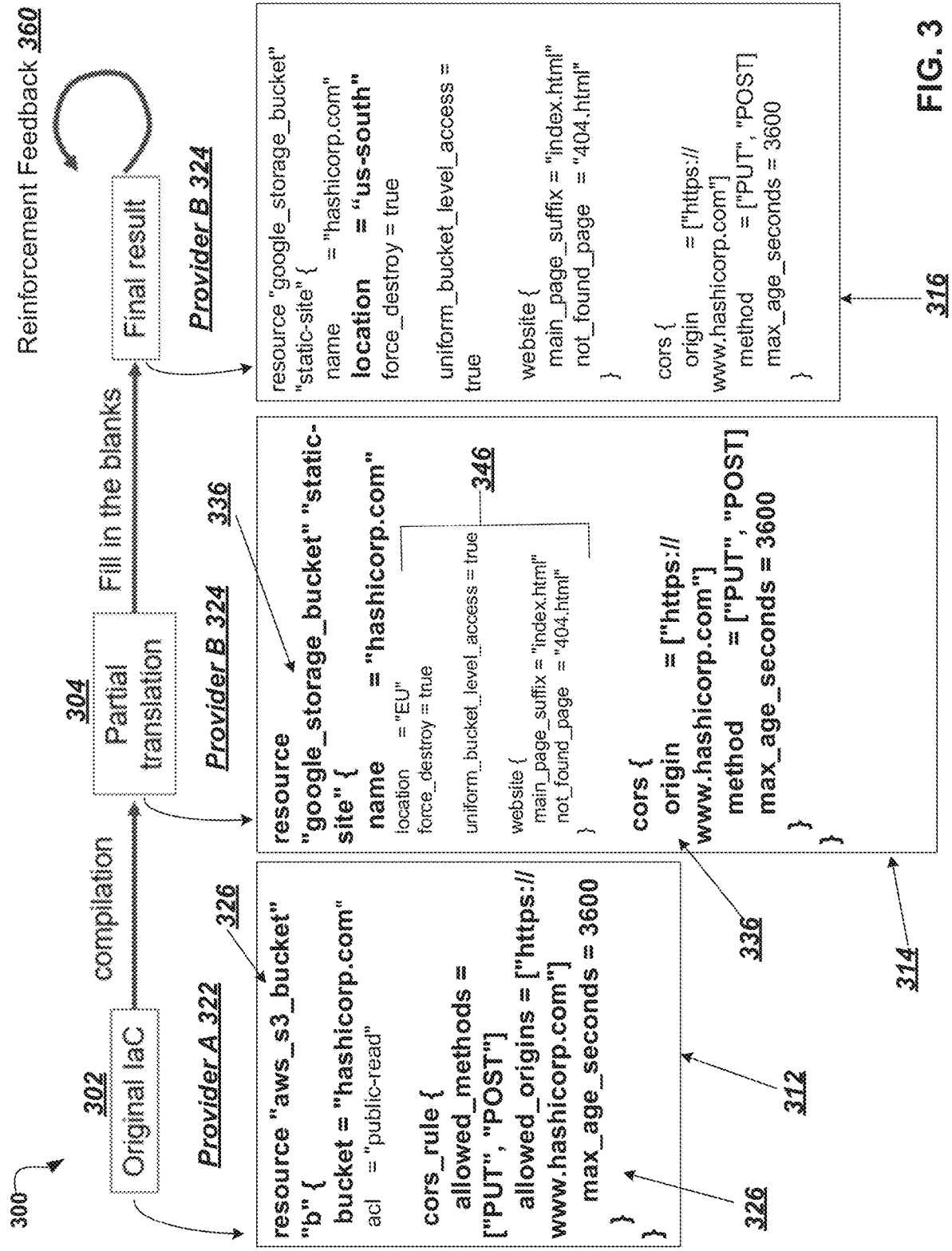
FIG. 3 is an example diagram illustrating an embodiment of the program for automatically migrating infrastructure as code (IaC) from a first cloud infrastructure platform to a second cloud infrastructure platform according to one embodiment.

Referring to FIG. 2 at 202, the IaC translator program 108A, 108B may receive an original IaC associated with a first cloud infrastructure platform. The original IaC is further exemplified in FIG. 3 at 302. As depicted in FIG. 3, the original IaC 302 may include original coding language 312 associated with the original IaC 302 of the first cloud infrastructure platform. The original coding language 312 may be a specific type of coding language that directly corresponds to the first cloud infrastructure platform. As depicted in FIG. 3, the original coding language shown at 312 includes just a small portion of coding language that may be part of a larger set of original coding language associated with the original IaC 312 of the first cloud infrastructure platform. Also, according to one embodiment, the first cloud infrastructure platform may be a cloud provider such as Provider A 322. As an example, Provider A 322 may be a cloud infrastructure platform such as AWS® and the original coding language 312 may include coding language that is specifically based on the AWS® platform. Furthermore, as specifically depicted in FIG. 3, the original coding language 312 may in this instance be implementing a storage bucket on the AWS® platform. However, and as previously described with respect to FIG. 1, an organization/user may wish to migrate an IaC implemented on the first cloud infrastructure platform (i.e. Provider A 322) to the IaC associated with a different cloud infrastructure platform, such as Provider B 324. For example, the organization/user may wish to migrate from the cloud infrastructure platform of AWS® (i.e. Provider A) to the cloud infrastructure platform of Google® Cloud (i.e. Provider B 324).

Accordingly, the two different cloud infrastructure platforms (i.e. AWS® and Google® Cloud) may have different ways, or include different types of coding language, for implementing the IaC, or more specifically, for implementing a same or similar type of resource on the cloud infrastructure platform. As previously described, rather than having to rebuild an IaC from scratch on Google® Cloud, the IaC translator program 108A, 108B may organize and build the IaC on Google® Cloud (Provider B 324) based on the existing original coding language 312 of the original IaC 302 that was previously built on AWS® (Provider A 322). More specifically, the IaC translator program 108A, 108B may, for example, translate the coding language 312 associated with AWS® (Provider A 322) to the coding language 314 associated with Google® Cloud (Provider B 324) to implement an IaC on the Google® Cloud platform.

As such, according to one embodiment, the IaC translator program 108A, 108B may include a user interface (not shown) where a user may be asked and prompted to select a cloud infrastructure platform that the user would like to switch from and a different cloud infrastructure platform that the user would like to switch to. For example, the IaC translator program 108A, 108B may include a switch from drop-down menu, whereby the switch from drop-down menu may include selectable cloud infrastructure platform options, including the first cloud infrastructure platform such as AWS® (Provider A 322), that a user may want to switch from. According to another embodiment, the user may simply input the original coding language 312 corresponding to the original IaC 302 that the user would like to switch from, and the IaC translator program 108A, 108B may use machine learning and natural language processing techniques/algorithms to identify a type of cloud infrastructure platform associated with the inputted original coding language 312. For example, and as previously described in FIG. 1, the IaC translator program 108A, 108B may interact with and/or include a database 116 that may store a repository of sample data whereby the sample data includes different infrastructure as code languages associated with different cloud infrastructure platforms, resources associated with the different cloud infrastructure platforms, and policy checks associated with the different cloud infrastructure platforms. As such, the IaC translator program 108A, 108B may use the machine learning and natural language processing algorithms to compare the inputted original coding language 312 with the sample data stored on the database 116 to determine a match to the type of cloud infrastructure platform associated with the inputted original coding language 312. Also, according to one embodiment, the IaC translator program 108A, 108B may include a switch to drop-down menu, whereby the switch to drop-down menu may also include different selectable cloud infrastructure platforms, such as Google® Cloud, that a user may want to switch to. In turn, and as depicted in FIG. 3, based on the selections made by the user described above and based on an initiation of a translation process (according to one embodiment, initiation may include detecting a press of an "Initiate Translation" button on the user interface), the IaC translator program 108A, 108B may begin a process for automatically translating the original coding language 312 associated with the original IaC 302 of the first cloud infrastructure platform (Provider A 322) to coding language 314 associated with the IaC of the different cloud infrastructure platform (Provider B 324).

As such, referring to FIG. 2 at 204, the IaC translator program 108A, 108B may begin the translation process by first using natural language processing techniques/algorithms to map a connection between the original coding language 312 associated with the received original IaC 302 and coding language 314 associated with the different and/or target cloud infrastructure platform (i.e. Provider B 324). More specifically, for example, different cloud infrastructure platforms may share certain commonalities in coding language and the implementation of certain resources. For example, certain coding language and syntax used for implementing a resource, such as a storage bucket, on AWS® (Provider A 322) may be similar to or the same as the coding language and syntax used for implementing that same or a similar resource on Google® Cloud (Provider B 324). As such, the IaC translator program 108A, 108B may use the natural language processing techniques/algorithms to identify the similarities in coding languages and syntax for implementing resources by, for example, mapping specific attributes (i.e. service-to-service mapping, attributes per service matching, and resource mapping) associated with the coding language 312 of the first cloud infrastructure platform (Provider A 322) to the coding language based on sample data associated with the different cloud infrastructure platform (Provider B 324) to determine a one-to-one relationship between the different coding languages.

For example, in FIG. 3, and as depicted in bolded text 326, 336 in both the original coding language 312 and the coding language 314, respectively, certain language and syntax may be similar and/or shared between both the original coding language 312 and the coding language 314 for implementing a storage bucket. As previously described, the IaC translator program 108A, 108B may identify the similarities using natural language processing techniques/algorithms to map the original coding language 312 to the sample data stored on database 116 that includes different coding languages and ways of implementing certain resources associated with different cloud infrastructure platforms. For example, according to one embodiment, the IaC translator program 108A, 108B may use known natural language processing techniques/algorithms such as word embedding, machine translation, topic modeling, text summarization, aspect mining, etc. Therefore, in response to the initiation of the translation process, the IaC translator program 108A, 108B may automatically map and compare the original coding language 312, as well as the resources implemented in the original coding language 312, to the sample data of the different target coding language, which in this example includes the target coding language of Google® Cloud (Provider B 324).

Next, and referring to FIG. 2 at 206, the IaC translator program 108A, 108B may perform a partial translation 304 of the original coding language 312 associated with Provider A 322 to the coding language 314 of the different cloud infrastructure platform associated with Provider B 324. Specifically, based on the one-to-one relationship identified using the natural language processing techniques/algorithms, the IaC translator program 108A, 108B may perform the partial translation 304 of the original coding language 312 associated with Provider A 322 to the coding language 314 associated with Provider B 324. As previously described, when mapping the original coding language 312 to the coding language 314, the IaC translator program 108A, 108B may identify the one-to-one relationship/connection between the coding languages. In return, based on the mapping and the determined one-to-one relationship/connection between the coding languages, the IaC translator program 108A, 108B may perform a partial translation 304 of the original coding language 312 associated with Provider A 322 to the coding language 314 associated with the Provider B 324, whereby the partial translation 304 that results in the coding language 314 of Provider B 324 is indicative of the mapping and determined one-to-one relationship/connection between the coding languages.

For example, and as depicted in FIG. 3, the original coding language 312 may include the following coding language (as depicted in bolded text 326 in the original coding language 312) for implementing a resource, such as a storage bucket on AWS® (Provider A 322):

```
resource "aws_s3_bucket"
"b" {
bucket = "hashicorp.com"
... (the ellipsis here indicates omitted text from the original coding language 312) cors_rule {
   allowed_methods = ["PUT", "POST"]
   allowed_origins = ["https://www.hashicorp.com"]
   max_age_seconds = 3600
   }
}.
```

According to one embodiment, based on the mapping and the determined one-to-one relationship/connection between the coding languages (i.e. between the original coding language 312 and the sample data that includes sample coding language associated with Google® Cloud), the IaC translator program 108A, 108B may make a partial translation 304 of the original coding language 312 to the coding language 314 of Google® Cloud (Provider B 324). For example, the partially translated coding language may include the following coding language 314 associated with Google® Cloud (Provider B 324), whereby the partial translation 304 includes coding language 336 (as indicated in bold) that may be based on the one-to-one relationship of the original coding language 312 for implementing the same and/or similar type of resource (i.e. the storage bucket) to the coding language 314 associated with Google® Cloud (Provider B 324):

```
resource "google_storage_bucket" "static-site"
{
   name = "hashicorp.com"
... (the ellipsis here indicates omitted text from the original coding
```

-continued

```
language 312) cors {
   origin= ["https://www.hashicorp.com"]
   method= ["PUT", "POST]
   max_age_seconds = 3600
   }
}
```

For example, as shown above and in FIG. 3, fields such as—"allowed_methods", "allowed_origins", and "max_age_seconds"—that are found in the original coding language 312 may be translated to corresponding fields—"method", "origin", and "max_age_seconds"—that may be found in the sample data and translated as such in the coding language 314. The similar fields may also have the same designation, i.e. "["PUT", "POST]", "["https://www.hashicorp.com"]", and "3600", respectively, based on the mapping to the sample data and the determined one-to-one relationship/connection. Therefore, the IaC translator program 108A, 108B may partially translate the original coding language associated with the original IaC 302 of Provider A 322 (which, in the example, is AWS®) to the coding language 314 associated with the IaC of Provider B (as an example, Google® Cloud).

However, while different cloud infrastructure platforms (such as AWS® and Google® Cloud) may share certain commonalities in coding language and other attributes, some coding language and attributes used for implementing a resource may not be shared or translate the same, and/or may require more or less coding language. As such, and as depicted in FIG. 2 at 208, the IaC translator program 108A, 108B may use a machine learning model, which includes one or more machine learning algorithms, to correct inaccuracies found in the partial translation. For example, correcting inaccuracies in the partial translation may include filling in missing language that is required to implement a similar or the same type of resource, rearranging certain coding language, removing coding language, and/or other editing of the coding language to meet the requirements of the different/target cloud infrastructure platform (such as Provider B 324).

For example, and as depicted in FIG. 3, additional coding language 346 may be necessary for the coding language 314 for implementing the storage bucket that was previously implemented on the first cloud infrastructure platform associated with Provider A 322 to the different/target cloud infrastructure platform associated with Provider B 324. As previously described, and according to one embodiment, the IaC translator program 108A, 108B may use a machine learning model to identify this additional coding language 346 and fill the additional coding language 346 in the particle translation. Specifically, the machine learning model may include known machine learning, deep learning, and neural network algorithms for learning to fill in and correct inaccuracies in the partial translation 304. Thus, while natural language processing techniques/algorithms may be used by the IaC translator program 108A, 108B for identifying similar coding language and making a partial translation (or more specifically, a one-to-one translation), the machine learning model may be used by the IaC translator program 108A, 108B to identify and correct inaccuracies (such as missing coding language) in the partial translation to generate a more complete translation.

According to one embodiment, the IaC translator program 108A, 108B may train the machine learning model using the sample data stored on the database 116. As previously described, the database 116 may include a repository of sample data that includes different infrastructure as code languages associated with different cloud infrastructure platforms, resources associated with the different cloud infrastructure platforms, policy checks associated with the different cloud infrastructure platforms, and other attributes associated with the different coding languages and different cloud infrastructure platforms. As such, the IaC translator program 108A, 108B may train the machine learning model to leverage the repository of sample data and, in turn, create one or more datasets that may include small blocks of data related to the specific resources, coding languages, and attributes associated with a given cloud infrastructure platform. In turn, the IaC translator program 108A, 108B may use the machine learning model to compare the created datasets based on the sample data to data associated with the partial translation in order to identify and correct inaccurate and/or missing data in the partial translation. Specifically, and with respect to the previously described example, the IaC translator program 108A, 108B may identify a resource and coding language implemented in the partial translation and that includes the coding language 314 for implementing the resource. However, based on a comparison of the partial translation to the trained machine learning model and the created datasets that include the resources, coding language, and other attributes specifically associated with the target cloud infrastructure platform (Provider B 324), the IaC translator program 108A, 108B may determine that additional coding language 346 corresponding to Provider B 324 is required for implementing the resource. As such, the IaC translator program 108A, 108B may use the machine learning model to fill in the missing coding language (as an example, coding language 346) to the partial translation 304 to generate the complete translation of the original coding language 312 to the coding language 314.

In return, and as depicted at 210 in FIG. 2, the IaC translator program 108A, 108B may generate a complete and final translation of the original coding language 312 associated with the first cloud infrastructure platform (Provider A 322) to the coding language 314 associated with the different/target cloud infrastructure platform (Provider B 324), and implement a second IaC on the different/target cloud infrastructure platform (Provider B 324) based on the complete and final translation. More specifically, the IaC translator program 108A, 108B may generate the complete and final translation based on the partial translation combined with the corrected inaccuracies that are made using the machine learning model. Thereafter, based on the complete and final translation, the IaC translator program 108A, 108B may implement a second IaC (translated from the original IaC) on the target cloud infrastructure platform (i.e. Provider B 324).

However, according to one embodiment, and as depicted at 212 in FIG. 2, the IaC translator program 108A, 108B may also receive reinforcement feedback to both further finalize the complete translation and further train the machine learning model. According to one embodiment, the reinforcement feedback 360 (as depicted in FIG. 3) may be based on user feedback as well as syntax validation and policy checks performed on the complete translation. Specifically, while the machine learning model may be a tool used by the IaC translator program 108A, 108B to identify and correct inaccuracies found in the partial translation, the machine learning model may still lack confidence and/or lack specific training regarding certain inaccuracies. As such, according to one embodiment, the IaC translator program 108A, 108B may use a confidence score or threshold percentage to further identify inaccuracies that, while may have been corrected in and/or added to the partial translation, the machine learning model may lack confidence and/or lack specific training regarding the correction/addition. According to one embodiment, the confidence score may be represented by a threshold percentage. For example, a confidence score represented by a threshold percentage, such as greater than 70%, may be set for corrected/added coding language that the machine learning model may be confident about and, thus, does not require additional review. Conversely, a confidence score represented by a threshold percentage, such as less than 70%, may be set for corrected/added coding language that the machine learning model may not be confident about and, thus, does require additional review. According to one embodiment, the machine learning model may revert to default settings (which may be configurable) for certain corrections/additions falling below the threshold percentage and then present the corrections/additions falling below the percentage threshold to a user for further review and user feedback.

For example, and as illustrated in FIG. 3 at 346, the IaC translator program 108A, 108B may use the machine learning model to add the coding language 346 to the partial translation for implementing the previously described storage bucket on Google® Cloud (Provider B 324). However, the machine learning model may lack confidence about the location of the storage bucket—i.e. in the coding language 346 that reads "location='EU'"—based on not knowing where a user would like the storage bucket to be stored or located. As such, the machine learning model may revert to a default setting, such as setting the location to "EU" in the coding language 346, for filling in location information for which the machine learning model lacks confidence. Additionally, the IaC translator program 108A, 108B may present (for example, on the previously described user interface), the coding language 346 associated with the location information for which the machine learning model lacks confidence. In turn, the IaC translator program 108A, 108B may receive user feedback, such as the user correcting "EU" to "us-south" as illustrated in coding language 316, whereby coding language 316 may represent the complete translation or a final translation of the original coding language 312 to the coding language associated with Provider B 324. The IaC translator program 108A, 108B may also use the user feedback as reinforcement feedback 360 to further train the machine learning model to, for example, account for situations where location information may need to be added to a partial translation of coding language related to a resource such as a storage bucket.

According to one embodiment, the IaC translator program 108A, 108B may also run additional checks to further finalize the complete translation of the original coding language 312 associated with the Provider A 322 to the coding language associated with the Provider B 324. For example, the IaC translator program 108A, 108B may run syntax validation and policy checks to determine whether running the complete translation presents an error. In response to receiving an error, the IaC translator program 108A, 108B may present the error to a user for further review and correction. According to one embodiment, results from the syntax validation and policy checks may also provide reinforcement feedback 360 to further train the machine learning model.

It may be appreciated that FIGS. 1-3 provide only illustrations of one implementation and does not imply any limitations with regard to how different embodiments may be implemented. Many modifications to the depicted environments may be made based on design and implementation requirements. For example, according to one embodiment, the IaC translator program 108A, 108B may detect whether a user comment does not provide enough information to fill one or more of the axes in the 3-axis framework associated with the viewer feedback matrix (i.e. the x-axis, y-axis, and z-axis), such as missing timeframe information and/or context information. As such, in response to a user posting a comment, the IaC translator program 108A, 108B may present a chatbot to follow up with a question to the user posting the comment to ask the user to provide such information. For example, in response to a user posting a comment simply stating, "coconut oil instead of butter", the IaC translator program 108A, 108B may present a chatbot to ask the user, "Which part of the recipe are you referring to replace the butter?"

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
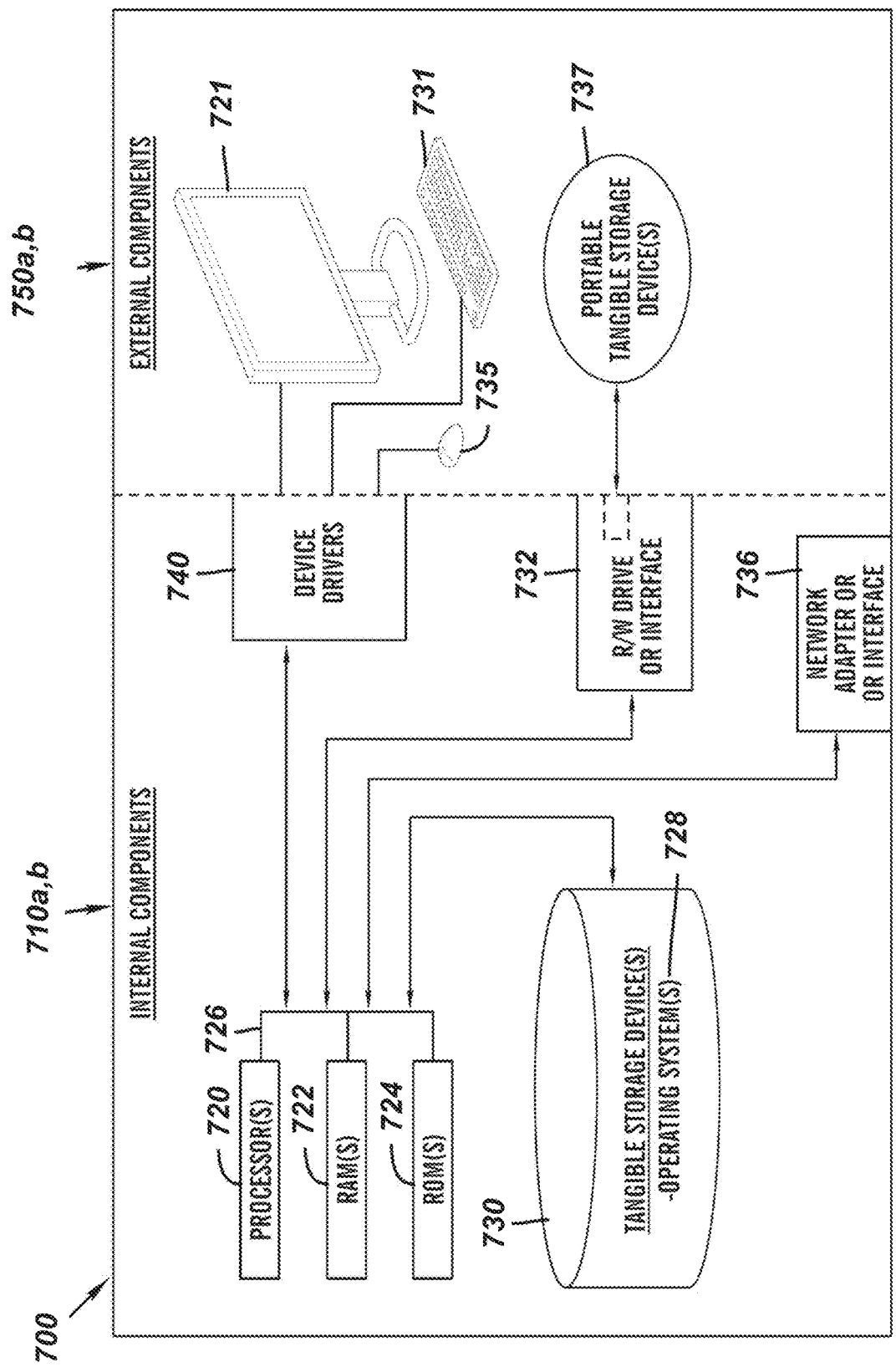
FIG. 4 is a block diagram of the system architecture of the program for automatically migrating infrastructure as code (IaC) from a first cloud infrastructure platform to a second cloud infrastructure platform according to one embodiment.
Figure 6:
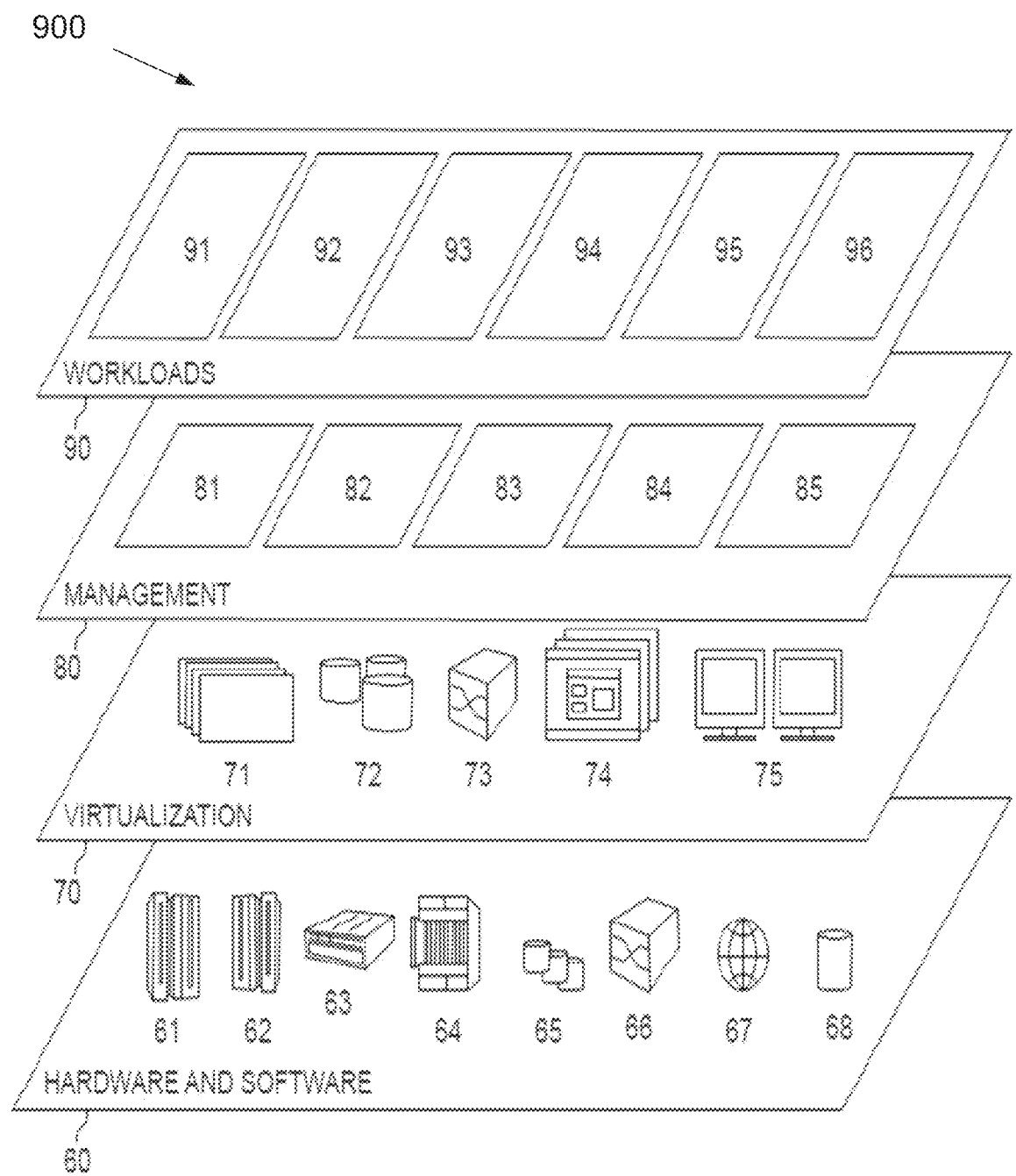
FIG. 6 is a block diagram of functional layers of the illustrative cloud computing environment of FIG. 5, in accordance with an embodiment of the present disclosure.

FIG. 4 is a block diagram 700 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 710 a, b and 750 a, b is representative of any electronic device capable of executing machine-readable program instructions that may include a computer 102 (710a and 750a) and/or a server 112 (710b and 750b). Data processing system 710 a, b and 750 a, b may be representative of a smart phone, a computer system, PDA, or other electronic devices. Examples of computing systems, environments, and/or configurations that may represented by data processing system 710 a, b and 750 a, b may include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 710 a, b and external components 750 a, b illustrated in FIG. 6. Each of the sets of internal components 710 a, b includes one or more processors 720, one or more computer-readable RAMs 722, and one or more computer-readable ROMs 724 on one or more buses 726, and one or more operating systems 728 and one or more computer-readable tangible storage devices 730. The one or more operating systems 728, the software program 114 (FIG. 1) and the IaC translator program 108A (FIG. 1) in client computer 102 (FIG. 1), and the IaC translator program 108B (FIG. 1) in network server computer 112 (FIG. 1) are stored on one or more of the respective computer-readable tangible storage devices 730 for execution by one or more of the respective processors 720 via one or more of the respective RAMs 722 (which typically include cache memory). In the embodiment illustrated in FIG. 6, each of the computer-readable tangible storage devices 730 is a magnetic disk storage device of an internal hard drive. Alternatively, each of the computer-readable tangible storage devices 730 is a semiconductor storage device such as ROM 724, EPROM, flash memory or any other computer-readable tangible storage device that can store a computer program and digital information.

Each set of internal components 710 a, b, also includes a R/W drive or interface 732 to read from and write to one or more portable computer-readable tangible storage devices 737 such as a CD-ROM, DVD, memory stick, magnetic tape, magnetic disk, optical disk or semiconductor storage device. A software program, such as an IaC translator program 108A and 108B (FIG. 1), can be stored on one or more of the respective portable computer-readable tangible storage devices 737, read via the respective R/W drive or interface 732, and loaded into the respective hard drive 730.

Each set of internal components 710 a, b also includes network adapters or interfaces 736 such as a TCP/IP adapter cards, wireless Wi-Fi interface cards, or 3G or 4G wireless interface cards or other wired or wireless communication links. The IaC translator program 108A (FIG. 1) and software program 114 (FIG. 1) in client computer 102 (FIG. 1), and the IaC translator program 108B (FIG. 1) in network server 112 (FIG. 1) can be downloaded to client computer 102 (FIG. 1) from an external computer via a network (for example, the Internet, a local area network or other, wide area network) and respective network adapters or interfaces 736. From the network adapters or interfaces 736, the IaC translator program 108A (FIG. 1) and software program 114 (FIG. 1) in client computer 102 (FIG. 1) and the IaC translator program 108B (FIG. 1) in network server computer 112 (FIG. 1) are loaded into the respective hard drive 730. The network may comprise copper wires, optical fibers, wireless transmission, routers, firewalls, switches, gateway computers, and/or edge servers.

Each of the sets of external components 750 a, b can include a computer display monitor 721, a keyboard 731, and a computer mouse 735. External components 750 a, b can also include touch screens, virtual keyboards, touch pads, pointing devices, and other human interface devices. Each of the sets of internal components 710 a, b also includes device drivers 740 to interface to computer display monitor 721, keyboard 731, and computer mouse 735. The device drivers 740, R/W drive or interface 732, and network adapter or interface 736 comprise hardware and software (stored in storage device 730 and/or ROM 724).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
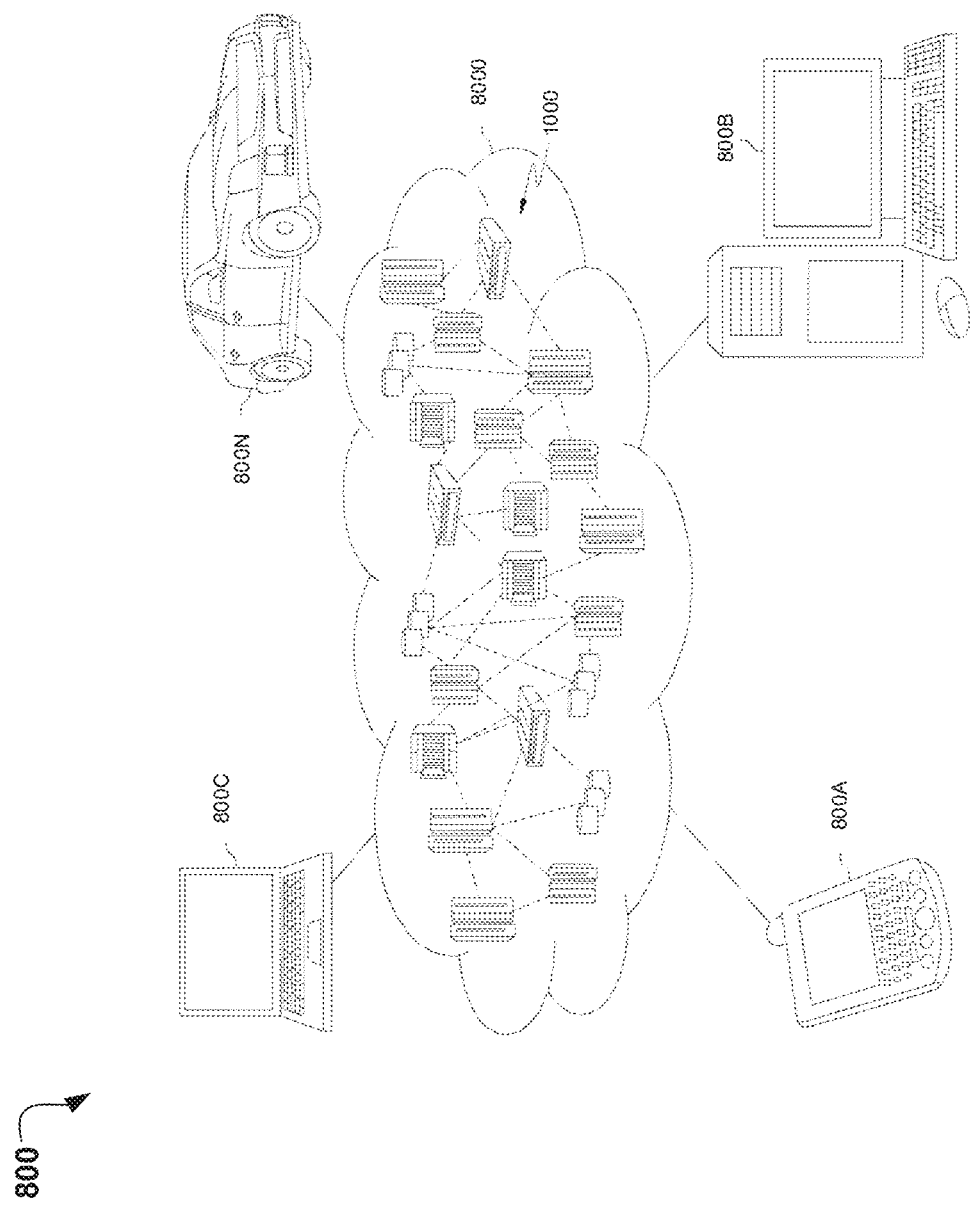
FIG. 5 is a block diagram of an illustrative cloud computing environment including the computer system depicted in FIG. 1, in accordance with an embodiment of the present disclosure.

Referring now to FIG. 5, illustrative cloud computing environment 800 is depicted. As shown, cloud computing environment 800 comprises one or more cloud computing nodes 1000 with which local computing devices used by cloud consumers, such as, for example, personal digital assistant (PDA) or cellular telephone 800A, desktop computer 800B, laptop computer 800C, and/or automobile computer system 800N may communicate. Nodes 1000 may communicate with one another. They may be grouped (not shown) physically or virtually, in one or more networks, such as Private, Community, Public, or Hybrid clouds as described hereinabove, or a combination thereof. This allows cloud 8000 to offer infrastructure, platforms and/or software as services for which a cloud consumer does not need to maintain resources on a local computing device. It is understood that the types of computing devices 800A-N shown in FIG. 7 are intended to be illustrative only and that computing nodes 100 and cloud 8000 can communicate with any type of computerized device over any type of network and/or network addressable connection (e.g., using a web browser).

Referring now to FIG. 6, a set of functional abstraction layers 900 provided by cloud computing environment 800 (FIG. 5) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and IaC translator 96. An IaC translator program 108A, 108B (FIG. 1) may be offered "as a service in the cloud" (i.e., Software as a Service (SaaS)) for applications running on computing devices 102 (FIG. 1) and may automatically migrating infrastructure as code (IaC) from a first cloud infrastructure platform to a second cloud infrastructure platform.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automatically migrating infrastructure as code (IaC) from a first cloud infrastructure platform to a second cloud infrastructure platform, comprising:
    receiving an original IaC associated with the first cloud infrastructure platform, wherein the original IaC comprises a first type of coding language associated with the first cloud infrastructure platform;
    using natural language processing to map a connection between the first type of coding language associated with the received original IaC and a second type of coding language associated with the second cloud infrastructure platform, wherein the first cloud infrastructure platform and the second cloud infrastructure are different cloud infrastructure platforms;
    based on the mapped connection, using the natural language processing to automatically generate a partial translation of the first type of coding language associated with the first cloud infrastructure platform to the second type of coding language associated with the second cloud infrastructure, wherein the partial translation is generated using the second type of coding language;
    determining whether at least one inaccuracy exist in the partial translation, and in response to the determining that the at least one inaccuracy exist, using a machine learning algorithm to correct the at least one inaccuracy; and
    based on the partial translation and the corrected at least one inaccuracy, generating a complete translation of the first type of coding language associated with the first cloud infrastructure platform to the second type of coding language associated with the second cloud infrastructure platform, and implementing a second IaC on the second cloud infrastructure platform based on the complete translation.

2. The computer-implemented method of claim 1, further comprising:
    training the machine learning algorithm to identify the inaccuracies in the partial translation, wherein the machine learning algorithm is trained using sample data from a repository of different coding languages associated with different cloud infrastructure platforms.

3. The computer-implemented method of claim 1, further comprising:
    receiving reinforcement feedback on the complete translation and using the reinforcement feedback to train the machine learning algorithm and to generate a final translation.

4. The method of claim 1, wherein correcting the at least one inaccuracy in the partial translation further comprises:
    filling in missing coding language in the partial translation and correcting incorrect coding language in the partial translation.

5. The computer-implemented method of claim 1, further comprising:
    performing syntax validation and policy checks on the complete translation; and
    using the syntax validation and the policy checks to train the machine learning algorithm.

6. The computer-implemented method of claim 1, wherein mapping the connection between the first type of coding language associated with the received original IaC and the second type of coding language associated with the second cloud infrastructure platform further comprises:
    mapping resources and attributes associated with the first type of coding language to a repository of sample data corresponding to the second type of coding language associated with the second cloud infrastructure platform.

7. The computer-implemented method of claim 1, wherein using the machine learning algorithm to correct the at least one inaccuracy further comprises:
    determining a confidence score for the corrected at least one inaccuracy.

8. A computer system for automatically migrating infrastructure as code (IaC) from a first cloud infrastructure platform to a second cloud infrastructure platform, comprising:
    one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
    receiving an original IaC associated with the first cloud infrastructure platform, wherein the original IaC comprises a first type of coding language associated with the first cloud infrastructure platform;
    using natural language processing to map a connection between the first type of coding language associated with the received original IaC and a second type of coding language associated with the second cloud infrastructure platform, wherein the first cloud infrastructure platform and the second cloud infrastructure are different cloud infrastructure platforms;
    based on the mapped connection, using the natural language processing to automatically generate a partial translation of the first type of coding language associated with the first cloud infrastructure platform to the second type of coding language associated with the second cloud infrastructure, wherein the partial translation is generated using the second type of coding language;
    determining whether at least one inaccuracy exist in the partial translation, and in response to the determining that the at least one inaccuracy exist, using a machine learning algorithm to correct the at least one inaccuracy; and
    based on the partial translation and the corrected at least one inaccuracy, generating a complete translation of the first type of coding language associated with the first cloud infrastructure platform to the second type of coding language associated with the second cloud infrastructure platform, and implementing a second IaC on the second cloud infrastructure platform based on the complete translation.

9. The computer system of claim 8, further comprising:
    training the machine learning algorithm to identify the inaccuracies in the partial translation, wherein the machine learning algorithm is trained using sample data from a repository of different coding languages associated with different cloud infrastructure platforms.

10. The computer system of claim 8, further comprising:
    receiving reinforcement feedback on the complete translation and using the reinforcement feedback to train the machine learning algorithm and to generate a final translation.

11. The computer system of claim 8, wherein correcting the at least one inaccuracy in the partial translation further comprises:
  filling in missing coding language in the partial translation and correcting incorrect coding language in the partial translation.

12. The computer system of claim 8, further comprising:
  performing syntax validation and policy checks on the complete translation; and
  using the syntax validation and the policy checks to train the machine learning algorithm.

13. The computer system of claim 8, wherein mapping the connection between the first type of coding language associated with the received original IaC and the second type of coding language associated with the second cloud infrastructure platform further comprises:
  mapping resources and attributes associated with the first type of coding language to a repository of sample data corresponding to the second type of coding language associated with the second cloud infrastructure platform.

14. The computer system of claim 8, wherein using the machine learning algorithm to correct the at least one inaccuracy further comprises:
  determining a confidence score for the corrected at least one inaccuracy.

15. A computer program product for automatically migrating infrastructure as code (IaC) from a first cloud infrastructure platform to a second cloud infrastructure platform, comprising:
  one or more tangible computer-readable storage devices and program instructions stored on at least one of the one or more tangible computer-readable storage devices, the program instructions executable by a processor, the program instructions comprising:
  receiving an original IaC associated with the first cloud infrastructure platform, wherein the original IaC comprises a first type of coding language associated with the first cloud infrastructure platform;
  using natural language processing to map a connection between the first type of coding language associated with the received original IaC and a second type of coding language associated with the second cloud infrastructure platform, wherein the first cloud infrastructure platform and the second cloud infrastructure are different cloud infrastructure platforms;
  based on the mapped connection, using the natural language processing to automatically generate a partial translation of the first type of coding language associated with the first cloud infrastructure platform to the second type of coding language associated with the second cloud infrastructure, wherein the partial translation is generated using the second type of coding language;
  determining whether at least one inaccuracy exist in the partial translation, and in response to the determining that the at least one inaccuracy exist, using a machine learning algorithm to correct the at least one inaccuracy; and
  based on the partial translation and the corrected at least one inaccuracy, generating a complete translation of the first type of coding language associated with the first cloud infrastructure platform to the second type of coding language associated with the second cloud infrastructure platform, and implementing a second IaC on the second cloud infrastructure platform based on the complete translation.

16. The computer program product of claim 15, wherein the program instructions further comprise:
  training the machine learning algorithm to identify the inaccuracies in the partial translation, wherein the machine learning algorithm is trained using sample data from a repository of different coding languages associated with different cloud infrastructure platforms.

17. The computer program product of claim 15, wherein the program instructions further comprise:
  receiving reinforcement feedback on the complete translation and using the reinforcement feedback to train the machine learning algorithm and to generate a final translation.

18. The computer program product of claim 15, wherein the program instructions for correcting the at least one inaccuracy in the partial translation further comprise:
  filling in missing coding language in the partial translation and correcting incorrect coding language in the partial translation.

19. The computer program product of claim 15, wherein the program instructions further comprise:
  performing syntax validation and policy checks on the complete translation; and
  using the syntax validation and the policy checks to train the machine learning algorithm.

20. The computer program product of claim 15, wherein the program instructions for mapping the connection between the first type of coding language associated with the received original IaC and the second type of coding language associated with the second cloud infrastructure platform further comprise:
  mapping resources and attributes associated with the first type of coding language to a repository of sample data corresponding to the second type of coding language associated with the second cloud infrastructure platform.

* * * * *